United States Patent
Paquin et al.

(10) Patent No.: US 11,299,990 B2
(45) Date of Patent: Apr. 12, 2022

(54) COOLED TURBINE VANE

(71) Applicant: SAFRAN, Paris (FR)

(72) Inventors: Sylvain Paquin, Moissy-Cramayel (FR); Adrien Bernard Vincent Rollinger, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 16/083,026

(22) PCT Filed: Mar. 9, 2017

(86) PCT No.: PCT/FR2017/050527
§ 371 (c)(1),
(2) Date: Sep. 7, 2018

(87) PCT Pub. No.: WO2017/153687
PCT Pub. Date: Sep. 14, 2017

(65) Prior Publication Data
US 2019/0093485 A1    Mar. 28, 2019

(30) Foreign Application Priority Data

Mar. 10, 2016  (FR) ...................... 16 52014

(51) Int. Cl.
*F01D 5/18* (2006.01)

(52) U.S. Cl.
CPC ............ *F01D 5/186* (2013.01); *F01D 5/187* (2013.01); *F05D 2220/323* (2013.01);
(Continued)

(58) Field of Classification Search
CPC .... F01D 5/186; F01D 5/187; F05D 2220/323; F05D 2240/301; F05D 2240/306; F05D 2260/202
See application file for complete search history.

(56) References Cited

U.S. PATENT DOCUMENTS

| 4,073,599 A | * | 2/1978 | Allen | ...................... F01D 5/187 |
| | | | | 416/97 R |
| 5,931,638 A | * | 8/1999 | Krause | .................... F01D 5/186 |
| | | | | 416/97 R |

(Continued)

FOREIGN PATENT DOCUMENTS

| EP | 1630354 A2 | 3/2006 |
| EP | 1659264 A2 | 5/2006 |

(Continued)

OTHER PUBLICATIONS

International Search Report for International Application No. PCT/FR2017/050527 dated Jun. 13, 2017.

(Continued)

*Primary Examiner* — Brian P Wolcott
*Assistant Examiner* — Sang K Kim
(74) *Attorney, Agent, or Firm* — Pearne & Gordon LLP

(57) ABSTRACT

The invention relates to a turbomachine turbine vane comprising a root having a blade (12) comprising a leading edge (16) and a trailing edge (17) and a lower surface wall (14) and an upper surface wall (13), as well as: a manifold for cooling (18) the leading edge (16); a supply line (19) for collecting air from the root and supplying the manifold (18); a side cavity (23) extending along the upper surface wall (13) and supplied with air from the root, to form a heat shield facing the supply line (19); and a circuit forming a trombone comprising a middle portion (24) extending along the supply line (19) and extending laterally to the upper surface wall (13), the middle portion (24) being supplied by the supply line at the tip of the blade (12).

9 Claims, 2 Drawing Sheets

(52) U.S. Cl.
CPC .. *F05D 2240/301* (2013.01); *F05D 2240/306* (2013.01); *F05D 2260/202* (2013.01); *Y02T 50/60* (2013.01)

(56) References Cited

U.S. PATENT DOCUMENTS

| | | | | |
|---|---|---|---|---|
| 6,168,381 B1* | 1/2001 | Reddy | ............... | F01D 5/186 415/116 |
| 6,220,817 B1* | 4/2001 | Durgin | ............... | F01D 5/187 415/115 |
| 7,137,779 B2* | 11/2006 | Liang | ............... | F01D 5/187 416/1 |
| 7,507,071 B2* | 3/2009 | Kopmels | ............... | F01D 5/187 415/115 |
| 7,695,243 B2 | 4/2010 | Lee et al. | | |
| 7,845,906 B2* | 12/2010 | Spangler | ............... | F01D 5/187 416/97 R |
| 2009/0238694 A1* | 9/2009 | Cunha | ............... | F01D 5/188 416/97 R |
| 2018/0073373 A1* | 3/2018 | Paquin | ............... | B22C 9/04 |

FOREIGN PATENT DOCUMENTS

| | | |
|---|---|---|
| EP | 2189230 A1 | 5/2010 |
| WO | 2015181497 A1 | 12/2015 |

OTHER PUBLICATIONS

Written Opinion for International Application No. PCT/FR2017/050527 dated Jun. 13, 2017.
French Search Report issued in Patent Application No. FR 16 52014 dated Nov. 2, 2016.

* cited by examiner

COOLED TURBINE VANE

This is a National Stage application of PCT international application PCT/FR2017/050527, filed on Mar. 9, 2017 entitled "COOLED TURBINE VANE", which claims the priority of French Patent Application No. 16 52014 filed Mar. 10, 2016, both of which are incorporated herein by reference in their entirety.

TECHNICAL DOMAIN

The invention relates to a blade of a turbomachine type aircraft engine, for example such as a twin spool turbojet engine or a two-spool turboprop engine.

STATE OF PRIOR ART

In such an engine 1, external air is drawn in through an intake duct 2 to pass through a fan 3 comprising a series of rotating airfoils before being split into a central core flow and a bypass flow surrounding the core flow.

The core flow is then compressed as it passes through a first and a second compression stage 4 and 6, before reaching a combustion chamber 7, after which it expands passing through a set of turbines 8 before being evacuated in the aft direction generating thrust. The bypass flow is propelled directly in the aft direction by the fan to generate a complementary thrust.

Expansion in the turbines 8 to drive the compressor 4, 6 and the fan 3, takes place at high temperature because it occurs immediately after combustion. This turbine 8 is thus designed and sized to operate under severe fluid temperature, pressure and flow conditions.

Each turbine comprises a series of stages each comprising a series of blades carried on the engine shaft, the blades subjected to the most severe conditions being those in the first expansion stages, called high pressure stages.

In general, increased performance needs and changes to regulations lead to the design of engines operating in increasingly severe environments, which implies increasing the strength of high pressure blades at high temperatures.

Nevertheless, improvements to materials and coatings used for these blades are not sufficient to resist the high temperatures that can occur, so that cooling of these blades needs to be reconsidered.

This cooling is achieved by circulating cool air inside these blades, drawn off upstream from combustion and inlet at the root of the blade, to pass along an internal circuit in the blade. This air is evacuated from the blade by drillings passing through its wall, that also makes it possible to create an air film on the outside surface of the blade cooler than the air derived from combustion, to limit the temperature of the blade.

To increase cooling, internal regions of the blade inside which air circulates comprises special features, in other words internal relief that disturbs the fluid flow of cooling air to increase heat transfer.

These traditional cooling architectures suffer from the fact that the length of the internal circuit in the blade leads to excessively heated air when it reaches the end of this circuit, such that its efficiency is limited in the regions at the end of the path.

The purpose of the invention is to disclose a blade structure that increases its cooling efficiency.

PRESENTATION OF THE INVENTION

To achieve this, the purpose of the invention is a turbine blade of a turbomachine such as a turboprop or a turbojet, this blade comprising a root supporting an airfoil extending along the length direction and terminating at a tip, this airfoil comprising a leading edge and a trailing edge located downstream from the leading edge following the direction of fluid circulation surrounding the airfoil in service, this airfoil comprising an intrados wall and an extrados wall at a lateral spacing from each other and each connecting the leading edge to the trailing edge, this airfoil comprising:
- an upstream manifold cooling the leading edge;
- an upstream feed conduit to collect air at the root and to provide a calibrated supply to the upstream manifold;
- a single extrados cavity in a single piece along the extrados wall and supplied with air from the blade root, to form a heat shield facing the upstream conduit;
- a trombone type circuit comprising a median portion along the part downstream from the upstream conduit and extending laterally as far as the extrados wall, this median portion being supplied by the upstream conduit at the tip of the airfoil.

The upstream conduit is thus efficiently isolated from heat from the extrados, such that cooling air has not yet been excessively heated when it reaches the median portion of the trombone circuit, to supply more efficient cooling. Advantageously, the length of the extrados cavity is reduced to correspond to the length of the upstream conduit, which facilitates homogeneous circulation of air in this cavity, to optimise its thermal efficiency.

The invention also relates to a blade thus defined, comprising an upper cavity at the tip of the airfoil and in which this upper cavity is fed by the upstream conduit.

The invention also relates to a blade thus defined, comprising a single intrados cavity in a single-piece that extends along the intrados wall to form another heat shield covering the median portion.

The invention also relates to a blade thus defined, in which the single intrados cavity covers the upstream conduit in addition to covering the median portion of the circuit forming a trombone.

The invention also relates to a blade thus defined, in which the trombone type circuit comprises a downstream portion, this downstream portion being supplied by the median portion close to the bottom of the blade, this downstream portion extending laterally from the extrados wall to the intrados wall, and drillings passing through the intrados wall towards the downstream portion to form an air film at the external face of the intrados wall.

The invention also relates to a blade thus defined, comprising a single dust removal hole common for the upstream conduit, the trombone conduit, and for the upper cavity.

The invention also relates to a blade thus defined, comprising a downstream feed manifold for blade trailing edge cooling slits, these slits passing through the intrados wall, and a calibrated downstream feed conduit for this downstream manifold that is distinct from the circuit forming a trombone, this downstream conduit being supplied with air from the blade root.

The invention also relates to a blade thus defined, comprising a downstream feed manifold for blade trailing edge cooling slits, these slits passing through the intrados wall, and a calibrated downstream feed conduit for this downstream manifold that corresponds to downstream portion of the circuit forming a trombone.

The invention also relates to casting means for manufacturing a blade thus defined, comprising cavities and a set of cores designed to form internal conduits and manifolds, and internal cavities forming a heat shield.

The invention also relates to a turbine comprising a blade this defined.

DETAILED PRESENTATION OF PARTICULAR EMBODIMENTS

The basis of the invention is a blade comprising a principal air supply conduit that is thermally insulated by an extrados cavity, and that provides calibrated supply to a cooling manifold on the leading edge and a trombone type circuit.

Figure 1:
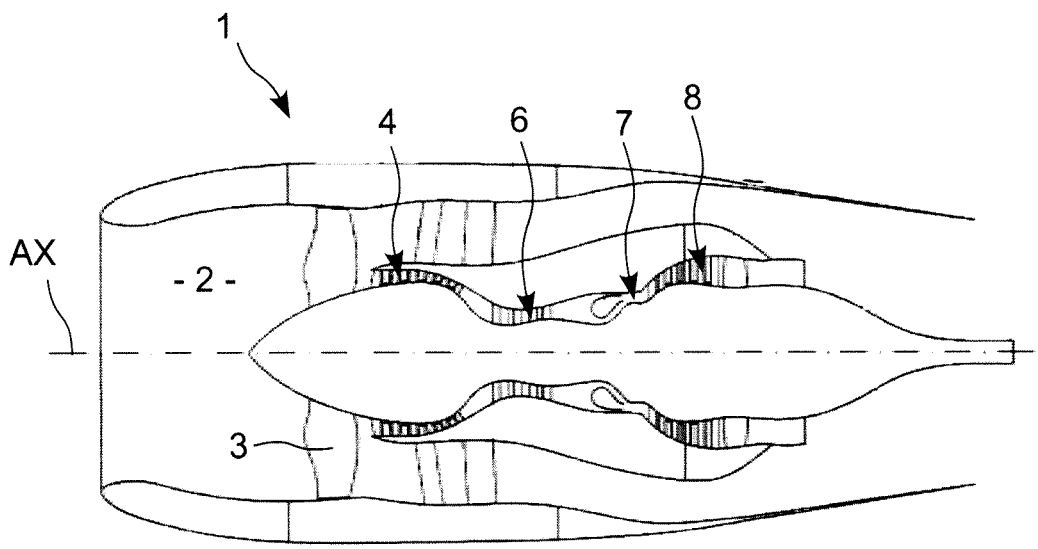
FIG. 1 is an overview of a twin spool turbojet shown in a sectional view in a longitudinal plane.
Figure 2:
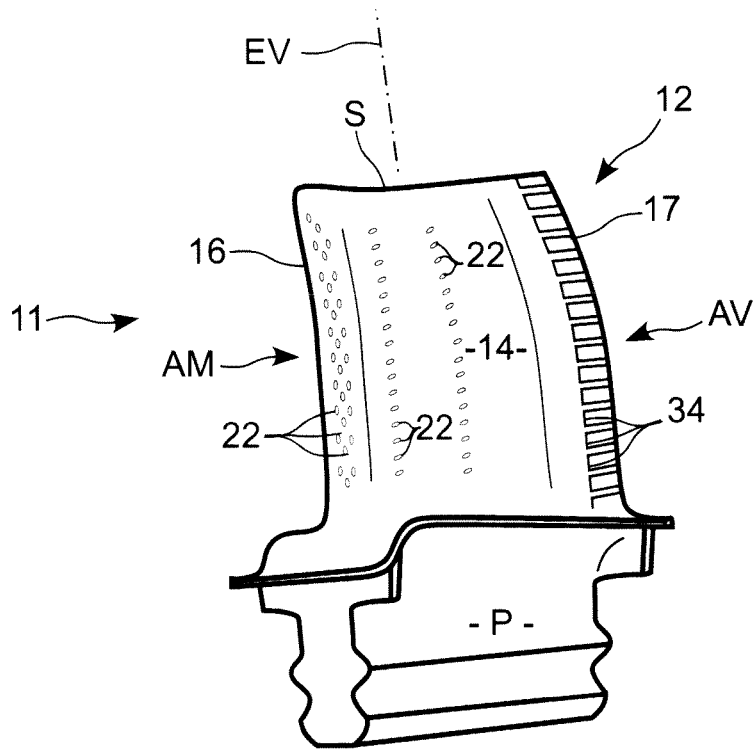
FIG. 2 is a perspective view of a turbine blade according to the invention.

This blade that is shown in FIG. 2 identified by mark 11 comprises a root P carrying an airfoil 12 extending along a length direction EV radial to its rotation axis AX. The airfoil 12 extends from a base or platform through which it is connected to the root P as far as a tip S corresponding to its free end, and it comprise an extrados wall 13 and an intrados wall 14.

These walls 13 and 14 join together at the leading edge 16 of the airfoil that corresponds to an upstream region AM, and at the tapered trailing edge 17 of the airfoil that corresponds to its downstream region AV. Upstream and downstream relate to the direction of circulation of fluid surrounding the airfoil in service, the trailing leading edge being downstream from the leading edge.

Figure 3:
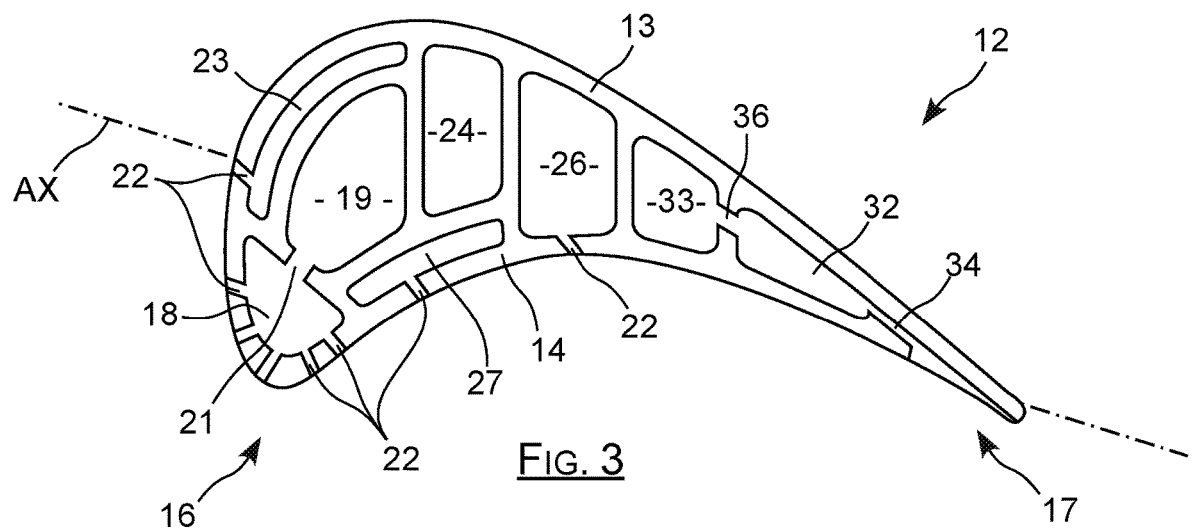
FIG. 3 is a sectional view of the airfoil of the blade according to the invention in a plane normal to the length direction of the blade.
Figure 4:
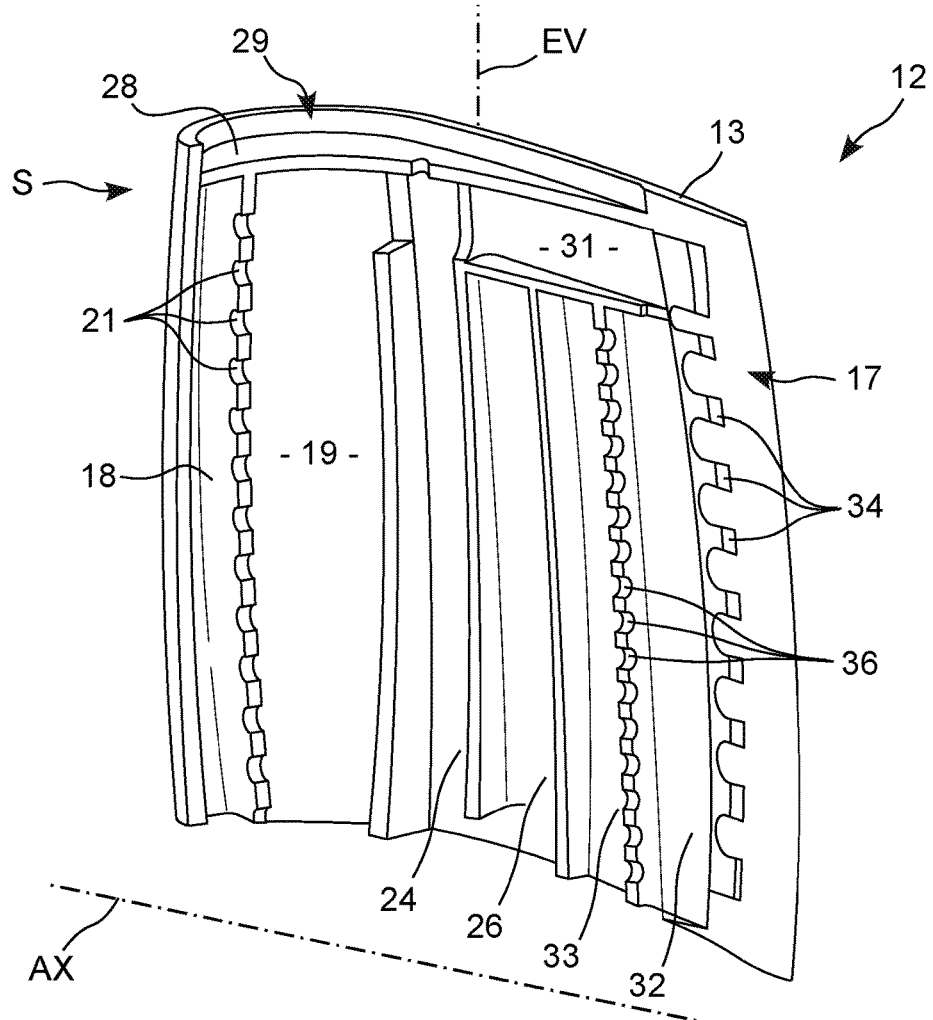
FIG. 4 is a sectional view of the airfoil of the blade according to the invention along a sectional surface along the median thickness of the airfoil.

As can be seen on FIGS. 3 and 4, this blade comprises an upstream cooling manifold 18 for its leading edge 16 downstream from which an upstream cooling air supply conduit 19 passes also running along the entire height of the airfoil along the length direction EV.

The upstream conduit 19 communicates with the upstream manifold 18 through a series of calibrated holes 21 uniformly spaced from each other and oriented perpendicular to the length direction EV, to feed this manifold in a calibrated manner, while providing cooling by impact on the leading edge 16.

As can be seen on FIG. 3, the airfoil 12 comprises holes 22 formed in its leading edge to evacuate cooling air that is routed in the upstream manifold 18 through the upstream conduit 19, through the holes 22. Other holes 22 formed through the intrados wall and the extrados wall evacuate cooling air circulating in other parts of the airfoil.

The upstream conduit 19 providing the principal air supply is separated from the extrados wall 13 by a single narrow extrados cavity 23 acting as a heat shield to cover only the upstream conduit 19 to protect it from heat received through the extrados. This extrados cavity 23 that is formed in a single piece and is not a trombone or similar type circuit, runs along the extrados and is narrow. It is delimited by a generally rectangular contour and extends over the entire height of the airfoil and over the entire length of the upstream conduit 19 along the extrados or the AX axis. This extrados cavity 23 is supplied with air directly through the blade root, in other words independently of the upstream conduit 19.

This blade comprises successively, downstream from the upstream conduit 19, a median conduit portion 24 alongside the conduit 19, and a downstream conduit portion 26 alongside the median portion 24 and downstream from the median portion. The median portion 24 is connected to the conduit 19 at the tip of the airfoil identified by S, and the downstream portion 26 is connected to the median portion 24 near the root of the airfoil.

The assembly formed by the upstream conduit 19 and the portions 24 and 26 thus forms a trombone type circuit having a serpentine shape. Air routed at the top of the airfoil, in other words at its tip S through the upstream conduit 19 then circulates towards the root of the airfoil through the median portion 24, then once again towards the tip of the airfoil through the downstream portion 26.

In a complementary manner, a single intrados cavity 27 running along the intrados wall 14 extends over the entire height of the airfoil covering only the assembly formed by the upstream conduit 19 and the median portion 24, to form a heat shield that isolates them from heat received through the intrados.

This intrados cavity 27 that also delimits a single internal space, is narrow and extends in the longitudinal direction from the upstream conduit 19 to the downstream portion 26. The intrados cavity 27 also has a generally rectangular contour and extends over the entire height of the airfoil along the EV direction, and over the entire length of the assembly composed of the conduits 19 and 24 along the AX axis.

Along the direction of the thickness of the blade, or the lateral direction that is substantially normal to its longitudinal AX direction, the median portion 24 extends from the extrados to the intrados cavity 27. The downstream portion 26, depending on the thickness of the blade, extends from the extrados wall 13 to the intrados wall 14.

Thus, in the example in the figures, the extrados cavity 23 thermally insulates the conduit 19, while the intrados cavity 27 thermally insulates the upstream conduit 19 and the median portion 24.

Furthermore, the downstream portion 26 of the trombone circuit in which air circulates from the root to the tip comprises holes passing through the intrados wall 14 to evacuate air circulating in this downstream portion 26 creating a cooling film covering the intrados in this region. Under these conditions, the loss of thermal efficiency due to the increase in the section of the trombone circuit in its downstream portion 26 is thus compensated by the creation of a cooling film at the outside face of the intrados wall.

As can be seen on FIG. 4, the tip region of the airfoil is delimited by a closing wall 28 oriented along the direction substantially normal to the direction of the length EV. This closing wall, jointly with the edges of the extrados wall 13 and the extrados wall 14, forms a hollow bath shape identified as 29 that terminates the airfoil at its tip.

In a complementary manner, the airfoil comprises an upper cavity identified as 31, also called the underbath cavity, and that improves cooling of the airfoil in the region of the bath.

This upper cavity 31, that runs along the closing wall 28 extending from the upstream conduit 19 to the trailing edge 17, is also supplied through the upstream conduit 19 being connected to it at the airfoil tip.

The trailing edge 17 of the airfoil is cooled by a downstream manifold 32 delivering air in a series of slits 34 through which it communicates with the intrados face. This downstream manifold 32 is supplied in a calibrated manner by a dedicated downstream conduit 33 with which it communicates through a series of calibrated holes 36 oriented perpendicular to the direction of the length EV and uniformly spaced from each other.

The downstream conduit 33 runs along the downstream portion 26 of the trombone-shaped circuit and is supplied directly from the root of the blade, independently of the upstream conduit 19. This downstream conduit 33 runs alongside the downstream manifold 32 to which it supplies air through different calibrated holes 36.

As can be seen on FIG. 4, this downstream conduit 33 supplies most slits 34 in the trailing edge. Only the slit(s) at the tip S are supplied through the upper cavity 31, so as to benefit from cooler air to increase their thermal efficiency in this region.

Alternatively, and particularly in the case of a shorter airfoil along the AX axis, it is possible that the downstream manifold is supplied directly by the downstream portion of the trombone-shaped circuit, in a calibrated manner. This can then simplify the general design of the blade, and subsequently its fabrication.

Note that in general, the invention can optimise the design of the blade and its cooling making use of the Coriolis effect. In particular, the median portion 24 efficiently cools the corresponding extrados portion because air circulates from the tip to the root in this median portion 24, such that it is forced by the Coriolis effect towards the closest face of the extrados when the blade is rotating about the AX axis. Furthermore, air descending in the median portion 24 along the extrados has been slightly heated because it was thermally protected by the extrados cavity 23, along which it was routed.

Furthermore, it would also be possible for the single intrados cavity to extend longitudinally along a shorter length than in the example in the figures, so as to cover only the median portion 24, without covering the upstream conduit 19.

Air in the upstream cavity 19 then efficiently cools the corresponding intrados portion, because it circulates from the root to the tip in this upstream conduit, such that the Coriolis effect tends to force circulating air towards the intrados wall when the blade is rotating.

This alternative can thus reduce the weight of the blade, once again making better use of the Coriolis effect.

In general, the invention makes it possible to take advantage of the efficiency of an extrados cavity and possibly an intrados cavity, forming a heat shield close to the leading edge, in other words in a region with severe thermal loads. Cooling in the region downstream from the trailing edge, where thermal loads are not as severe, is achieved by the trombone circuit.

The cool air supply for the trombone circuit, the underbath cavity and the upstream manifold from the same insulated upstream supply conduit can simplify the design of the blade root by reducing the number of conduits that have to go down into the root to obtain an air supply. It also contributes to limiting the number of dust removal holes because a single dust removal hole at the tip serves the underbath cavity, the upstream manifold and also the trombone circuit.

What is claimed is:

1. A rotary turbine blade of a turbomachine such as a turboprop or a turbojet, this blade comprising a root supporting an airfoil extending along the length direction and terminating at a tip, this airfoil comprising a leading edge and a trailing edge located downstream from the leading edge following the direction of fluid circulation surrounding the airfoil in service, this airfoil comprising an intrados wall and an extrados wall at a lateral spacing from each other and each connecting the leading edge to the trailing edge, this airfoil comprising:
   an upstream cooling manifold for the leading edge;
   an upstream feed conduit to collect air at the root and to provide a calibrated supply to the upstream manifold;
   a single extrados cavity along the extrados wall and supplied with air from the blade root, to form a heat shield covering a portion of the upstream feed conduit along the extrados wall;
   a serpentine-shaped circuit comprising a median portion along the part downstream from the upstream feed conduit and extending laterally as far as the extrados wall, this median portion being supplied by the upstream feed conduit at the tip of the airfoil; and
   a single intrados cavity that extends along the intrados wall to form another heat shield covering the upstream feed conduit and the median portion of the serpentine-shaped circuit,
   wherein the median portion is separated from the intrados cavity by an intermediate wall extending parallel to the intrados wall, and wherein the median portion extends from the extrados wall to the intermediate wall, and wherein the intrados cavity extends over an entire length of both the upstream feed conduit and the median portion along the intrados wall, and wherein the intrados cavity covers only the upstream feed conduit and the median portion.

2. The blade according to claim 1, comprising an upper cavity at the tip of the airfoil and in which this upper cavity is fed by the upstream feed conduit.

3. The blade according to claim 1, in which the serpentine-shaped circuit comprises a downstream portion, this downstream portion being supplied by the median portion close to the bottom of the blade, this downstream portion extending laterally from the extrados wall to the intrados wall, and drillings passing through the intrados wall towards the downstream portion to form an air film at the external face of the intrados wall.

4. The blade according to claim 2, comprising a single dust removal hole common for the upstream feed conduit, the serpentine-shaped circuit, and for the upper cavity.

5. The blade according to claim 1, comprising a downstream feed manifold for cooling slits, these slits passing through the intrados wall at the trailing edge, and a calibrated downstream feed conduit for this downstream manifold that is distinct from the serpentine-shaped circuit, this downstream conduit being supplied with air from the blade root.

6. The blade according to claim 1, comprising a downstream feed manifold for cooling slits, these slits passing through the intrados wall at the trailing edge, and a calibrated downstream feed conduit for this downstream manifold that corresponds to a downstream portion of the serpentine-shaped circuit.

7. A casting means for manufacturing a blade according to claim 1, comprising cavities and a set of cores designed to form internal conduits and manifolds, and internal cavities forming a heat shield.

8. A turbomachine comprising a blade according to one of claim 1.

9. The blade according to claim 1, wherein the extrados cavity does not extend between the extrados wall and the median portion.

\* \* \* \* \*